(12) United States Patent
Yamaguchi et al.

(10) Patent No.: US 12,473,472 B2
(45) Date of Patent: *Nov. 18, 2025

(54) PHOTOCURABLE ADHESIVE

(71) Applicants: DENSO CORPORATION, Kariya (JP); ADEKA CORPORATION, Tokyo (JP)

(72) Inventors: Kazuma Yamaguchi, Kariya (JP); Takao Izumi, Kariya (JP); Keisuke Ota, Kuki (JP); Kohei Hirayama, Kuki (JP); Shinsuke Yamada, Kuki (JP); Ryo Ogawa, Kuki (JP)

(73) Assignees: DENSO CORPORATION, Kariya (JP); ADEKA CORPORATION, Tokyo (JP)

( * ) Notice: Subject to any disclaimer, the term of this patent is extended or adjusted under 35 U.S.C. 154(b) by 769 days.

This patent is subject to a terminal disclaimer.

(21) Appl. No.: 17/687,728

(22) Filed: Mar. 7, 2022

(65) Prior Publication Data

US 2022/0282139 A1    Sep. 8, 2022

(30) Foreign Application Priority Data

Mar. 8, 2021   (JP) .................. 2021-036465

(51) Int. Cl.
  *C09J 175/04*   (2006.01)
  *C08G 18/00*   (2006.01)
  *C09J 11/04*   (2006.01)

(52) U.S. Cl.
  CPC .......... *C09J 175/04* (2013.01); *C08G 18/003* (2013.01); *C09J 11/04* (2013.01)

(58) Field of Classification Search
  None
  See application file for complete search history.

(56) References Cited

U.S. PATENT DOCUMENTS

2005/0231528 A1   10/2005  Shioda et al.
2022/0282138 A1    9/2022  Yamaguchi et al.

FOREIGN PATENT DOCUMENTS

| JP | 200515553 A | 1/2005 | |
| JP | 2005-221853 A | 8/2005 | |
| JP | 2010-180352 A | 8/2010 | |
| JP | 4839564 B2 * | 12/2011 | ............. C08G 59/18 |

OTHER PUBLICATIONS

U.S. Appl. No. 17/687,733, filed Mar. 7, 2022, Yamaguchi et al.

* cited by examiner

*Primary Examiner* — Sanza L. McClendon
(74) *Attorney, Agent, or Firm* — Harness, Dickey & Pierce, P.L.C.

(57) ABSTRACT

There is provided a photocurable adhesive which is capable of reducing the amount of gas discharged from the cured product. A photocurable adhesive is formulated to be curable by laser light irradiation. The photocurable adhesive contains an epoxy adhesive component, and a light-absorbing component configured to generate heat by laser light irradiation. The epoxy adhesive component contains a cyanate ester resin (A), epoxy resin (B), latent amine curing agent (C), and ion scavenger (D).

8 Claims, 4 Drawing Sheets

PHOTOCURABLE ADHESIVE

CROSS-REFERENCE TO RELATED APPLICATION

This application is based on and claims the benefit of priority from earlier Japanese Patent Application No. 2021-36465 filed Mar. 8, 2021, the description of which is incorporated herein by reference.

BACKGROUND

The present disclosure relates to a photocurable adhesive. Photocurable adhesives formulated to be curable by light irradiation are used in various fields, taking advantages of characteristics that the time required for curing is relatively short.

SUMMARY

An aspect of the present disclosure is a photocurable adhesive (1) formulated to be curable by laser light irradiation.

The photocurable adhesive contains an epoxy adhesive component (11), and a light-absorbing component (12) configured to generate heat by the laser light irradiation.

The epoxy adhesive component (11) contains a cyanate ester resin (A), an epoxy resin (B), a latent amine curing agent (C) containing active hydrogen, and an ion scavenger (D)

It should be noted that the bracketed reference signs indicated in the claims and in the description set forth above indicate correspondence to the specific means described in the embodiments provided below, and should not limit the technical scope of the present disclosure,

DETAILED DESCRIPTION OF THE PREFERRED EMBODIMENTS

Photocurable adhesives formulated to be curable by light irradiation are used in various fields, taking advantages of characteristics that the time required for curing is relatively short. For example, JP 2010-180352 A describes a rapid photocuring epoxy adhesive composition containing an epoxy adhesive component and a light-absorbing component that can heat and cure the epoxy adhesive by absorbing laser light.

In recent years, adhesives are often used for bonding components together, for example, for optical devices, such as on-vehicle camera modules, LiDAR (light detection and ranging) modules, and head-up displays. However, in the adhesive composition of JP 2010-180352 A, gas may be produced from the cured product of the adhesive and may remain inside the optical devices. This gas may be sublimated and deposited in the optical devices and vary optical characteristics, such as light reflectance and transmittance, of the components.

The present disclosure has been made in consideration of the above mentioned problem, and is to provide a photocurable adhesive which can reduce the amount of gas discharged from the cured product.

An aspect of the present disclosure is a photocurable adhesive (1) formulated to be curable by laser light irradiation containing an epoxy adhesive component (11), and a light-absorbing component (12) configured to generate heat by the laser light irradiation, wherein the epoxy adhesive component (11) contains a cyanate ester resin (A), an epoxy resin (B), a latent amine curing agent (C) containing active hydrogen, and an ion scavenger (D).

The epoxy adhesive component (11) of the photocurable adhesive (1) contains an ion scavenger (D), in addition to a cyanate ester resin (A), epoxy resin (B), and latent amine curing agent (C) for developing adhesion. Thus, the ion scavenger (D) mixed in the epoxy adhesive component can capture the ionic volatile components, volatile organic acids, and the like produced in the cured product of the photocurable adhesive. Consequently, the amount of gas externally discharged from the cured product can be reduced.

As described above, according to the above aspect, there can be provided a photocurable adhesive (1) that can reduce the amount of gas discharged from the cured product.

First Embodiment

Figure 1:
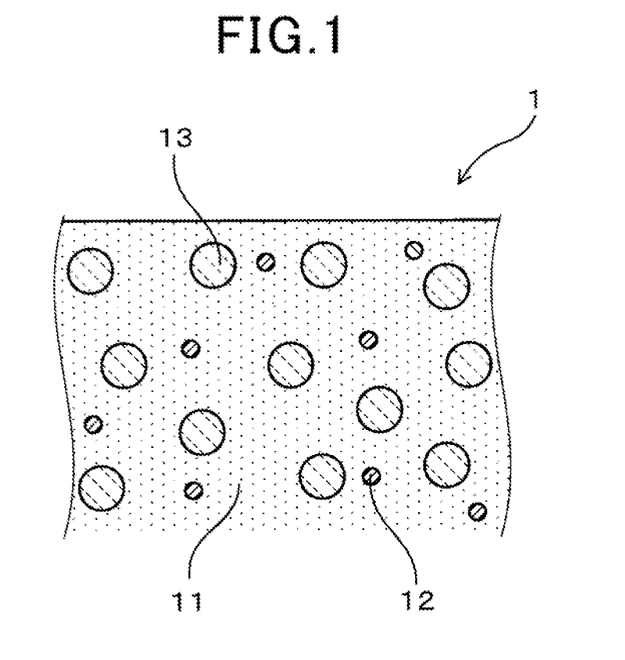
FIG. 1 is a schematic diagram illustrating a photocurable adhesive according to a first embodiment.

Referring to FIG. 1, an embodiment related to the photocurable adhesive will be described, A photocurable adhesive 1 according to the present embodiment is formulated to be curable by laser light irradiation. The laser light applied to the photocurable adhesive 1 may need to have a wavelength according to the absorption wavelength of a light-absorbing component. The laser light may be a near infrared laser, for example, having a wavelength in the range of 780 nm to 3 μm. The photocurable adhesive 1 contains an epoxy adhesive component 11 and a light-absorbing component 12 which is formulated to generate heat by laser light irradiation. Hereinafter, a detailed formulation of the photocurable adhesive 1 will be described.

1. Epoxy Adhesive Component

The epoxy adhesive component 11 in the photocurable adhesive 1 is formulated to be cured by heat generated in the light-absorbing component 12 when laser light is applied thereto. The epoxy adhesive component 11 contains a cyanate ester resin (A) an epoxy resin (B), a latent amine curing agent (C), and an ion scavenger (D).

1-1, Cyanate Ester Resin (A)

As the cyanate ester resin (A), compounds having two or more cyanate groups (—O—CN) per molecule can be used. The cyanate ester resin (A) may be, for example, at least one compound selected from the group consisting of compounds (A-1) expressed by the following General Formula (1), compounds (A-2) expressed by the following General Formula (2), and polymers (A-3) which are polymers of at least one of the compounds (A-1) or (A-2).

In General Formula (1), $A^1$ and $A^2$ each independently represent an unsubstituted phenylene group, or a phenylene group substituted with one or more of alkyl groups having

1 to 4 carbon atoms, and $Y^1$ represents a divalent hydrocarbon group that may have an ether bond, thioether bond, and/or substituent group.

General Formula (2)

In General Formula (2), m represents an integer equal to or greater than 1, $R^1$ to $R^6$ each independently represent a hydrogen atom or an alkyl group having 1 to 4 carbon atoms, and $Y^2$ and $Y^3$ each independently represent a divalent hydrocarbon group or a fluorine-substituted divalent alkylene group.

$Y^1$ in General Formula (1) and $Y^2$ and $Y^3$ in General Formula (2) may be, for example, a divalent hydrocarbon group expressed by the following Structural Formulae (3) to (11).

In Structural Formulae (3) to (11), the mark * represents atomic bonding. In Structural Formula ($R^7$ and $R^8$ each independently represent a hydrogen atom, an unsubstituted methyl group, or a fluorine-substituted methyl group. In Structural Formula (11), n represents an integer that is 4 or greater and 12 or smaller.

More specifically, the cyanate ester resin (A) is particularly preferably a bisphenol type cyanate ester resin.

1-1 Epoxy Resin (B)

As the epoxy resin (B), compounds having two or more epoxy groups per molecule can be used. The epoxy resin (B) may be formed of only one compound having epoxy groups, or may be formed of two or more of compounds having epoxy groups.

The content of the epoxy resin (B) in the photocurable adhesive 1 can be appropriately determined so as to be in the range of 1 part by mass or more and 10,000 parts by mass or less relative to 100 parts by mass of the cyanate ester resin (A), When the content of the epoxy resin (B) is 1 part by mass or more relative to 100 parts by mass of the cyanate ester resin (A), the photocurable adhesive 1 can be sufficiently cured when laser light is applied thereto. From the perspective of further enhancing curability of the photocurable adhesive 1, the content of the epoxy resin (B) is preferably 10 parts by mass or more, and more preferably 20 parts by mass or more, relative to 100 parts by mass of the cyanate ester resin (A).

When the content of the epoxy resin (B) is 10,000 parts by mass or less relative to 100 parts by mass of the cyanate ester resin (A), a cured product having good physical properties can be obtained. From the perspective of further enhancing physical properties of the cured product, the content of the epoxy resin (B) is preferably 1,000 parts by mass or less, and more preferably 500 parts by mass or less, relative to 100 parts by mass of the cyanate ester resin (A).

Examples of the epoxy resin (B) may include polyglycidyl ether compounds of mononuclear polyvalent phenolic compounds such as hydroquinone, resorcin, pyrocatechol, and phloroglucinol; polyglycidyl ether compounds of polynuclear polyvalent phenol compounds such as dihydroxynaphthalene, biphenol, methylene bisphenol (bisphenol F), methylene bis(orthocresol), ethylidene bisphenol, isopropylidene bisphenol (bisphenol A), isopropylidene bis (orthocresol), tetrabromobisphenol-A, 1,3-bis(4-hydroxycumylbenzene), 1,4-bis(4-hydroxycumylbenzene), 1,1,3-tris(4-hydroxyphenyl) butane, 1,1,2,2-tetra(4-hydroxyphenyl) ethane, thiobisphenol, sulfobisphenol, oxybisphenol, phenol novolak, orthocresol novolak, ethylphenol novolak, butylphenol novolak, octylphenol novolak, resorcin novolak, and terpene phenol; polyglycidyl ethers of polyvalent alcohols such as ethylene glycol, propylene glycol, butylene glycol, hexanediol, polyglycol, thiodiglycol, glycerin, trimethylolpropane, pentaerythritol, sorbitol, and bisphenol A ethylene oxide adduct; glycidyl esters of aliphatic, aromatic or alicyclic polybasic acid such as maleic acid, fumaric acid, itaconic acid, succinic acid, glutaric acid, suberic acid, adipic acid, azelaic acid, sebacic acid, dimeric acid, trimeric acid, phthalic acid, isophthalic acid, terephthalic acid, trimellitic acid, trimesic acid, pyromellitic acid, tetrahydrophthalic acid, hexahydrophthalic acid, and endomethylene tetrahydrophthalic acid; homopolymers or copolymers of glycidyl methacrylate; epoxy compounds having a glycidylamino group such as N, N-diglycidylaniline, bis (4-(N-methyl-N-glycidylamino) phenyl) methane, and diglycidyl orthotoluidine; epoxy compounds of cyclic olefin compounds such as vinyl cyclohexene diepoxide, dicyclopentadiene diepoxide, 3,4-epoxycyclohexylmethyl-3,4-epoxycyclohexanecarboxylate, 3,4-epoxy-6-methylcyclohexylmethyl-6-methylcyclohexanecarboxylate, and bis(3,4-epoxy-6-methylcyclohexylmethyl) adipate; epoxidized conjugated diene polymers such as epoxidized polybutadiene and epoxidized styrene-butadiene copolymer; and heterocyclic compounds such as triglycidyl isocyanurate. These compounds may be internally cross-linked by a prepolymer of terminal isocyanate, or may be high molecular weighted by a polyvalent active hydrogen compound (polyphenols, polyamines, carbonyl group-containing compounds, polyphosphoric acid esters, etc.).

From the perspective of reactivity, the epoxy resin (B) preferably contains a glycidyl type epoxy resin having a glycidyl group, and more preferably contains one or more compounds selected from the group consisting of polyglycidyl ether compounds of polynuclear polyvalent phenol compounds, epoxy compounds having a glycidylamino group, and polyglycidyl ether compounds of dicyclopentadiene dimethanol. When the epoxy resin (B) contains a polyglycidyl ether compound of a polynuclear polyvalent phenol compound, heat resistance of the cured product can be further improved. If the epoxy resin (B) contains an epoxy compound having a glycidylamino group, is reactivity of the photocurable adhesive 1 can be further improved, and heat resistance of the cured product can be further improved. When the epoxy resin (B) contains a polyglycidyl ether compound of dicyclopentadiene dimethanol, adhesion can be imparted to the photocurable adhesive 1.

1-3. Latent Amine Curing Agent (C)

As the latent amine curing agent (C), for example, compounds containing active hydrogen derived from amino groups, or mixtures containing one or more of these compounds can be used. The content of the latent amine curing agent (C) can be appropriately determined so as to be in the range of 1 part by mass or more and 100 parts by mass or less relative to a total of 100 parts by mass of the cyanate ester resin (A) and the epoxy resin (B). The content of the latent amine curing agent (C) is preferably 5 parts by mass to 60 parts by mass relative to a total of 100 parts by mass o the cyanate ester resin (A) and the epoxy resin (B).

The latent amine curing agent (C) may be, for example, a modified amine (C-1) obtainable by reaction of an amine compound having one or more active hydrogen atoms per molecule with an epoxy compound. The latent amine curing agent (C) may be formed of one modified amine (C-1), or two or more modified amines (C-1).

The modified amine (C-1) contains amine structural units derived from the amine compounds, and epoxy structural units derived from the epoxy compounds, i.e., has a structure in which the amine structural units and the epoxy structural units are bonded together. The amine compounds used for the modified amine (C-1) may be, for example, diamines having two primary and/or secondary amino groups per molecule, or polyamines having two or more primary and/or secondary amino groups per molecule, One of these amine compounds may be used alone or two or more of these amine compounds may be used in combination.

More specifically, the amine compounds used for the modified amine (C-1) may include aliphatic diamines and polyamines such as ethylenediamine, diethylenetriamine, triethylenetetramine, tetraethylenepentamine, polyoxypropylenediamine, and polyoxypropylenetriamine; alicyclic diamines and polyamines such as isophorone diamine, mensendiamine, bis(4-amino-3-methyldicyclohexyl) methane, diaminodicyclohexylmethane, bis(aminomethyl) cyclohexane, N-amiroethylpiperazine, and 3,9-bis(3-aminopropyl)-2, 4,840-tetraoxaspiro (5.5) undecane; mononuclear diamines and polyamines such as m-phenylenediamine, p-phenylenediamine, tolylene-2,4-diamine, tolylene-2,6-diamine, mesitylene-2,4-diamine, mesitylene-2,6-diamine, 3,5-diethyltolylene-2,4-diamine, and 3,5-diethyltolylene-2,6-diamine; aromatic diamines and polyamines such as biphenylenediamine, 4,4-diaminodiphenylmethane, 2,5-naphthylenediamine, and 2,6-naphthylenediamine; and imidazole compounds having an amino group such as 2-aminopropylimidazole. Furthermore, the amine compounds used for the modified amine (C-1) may be epoxy modified amines obtainable by reaction of the compounds mentioned above with epoxy compounds. One of these amine compounds may be used alone or two or more of these amine compounds may be used in combination.

The modified amine (C-1) preferably has structural units which are derived from one or more amine compounds selected from the group consisting of diamines having two primary and/or secondary amino groups per molecule with different reactivities, and polyamines having two or more primary and/or secondary amino groups per molecule in which, when one of the amino groups reacts with an epoxy group, the steric hindrance reduces reactivity of the remaining primary and/or secondary amino groups with an epoxy group. The modified amine (C-1) obtainable using these amine compounds can improve adhesion of the photocurable adhesive 1 or physical properties of the cured product. It should be noted that the diamines mentioned above include aliphatic diamines, alicyclic diamines, and aromatic diamines. Also, the polyamines mentioned above include aliphatic polyamines, alicyclic polyamines, and aromatic polyamines.

Examples of such diamines may include isophorone diamine, menthanediamine, 2,2,4-trimethylhexamethylenediamine, trimethylhexamethylenediamine and 1,2-diaminopropane, m-xylylenediamine, 1,3-bisaminocyclohexane, and N-aminoethylpiperazine.

Furthermore, imidazole compounds containing a primary amino group such as 2-aminopropylimidazole may also be used as the amine compounds. The modified amine (C-1) obtainable using such imidazole compounds can further improve cold curability of the photocurable adhesive 1, and therefore, the photocurable adhesive 1 can be cured more easily even at low temperatures.

The epoxy compounds used for the modified amine (C-1 may need to have one or more epoxy groups per molecule.

More specifically, the epoxy compounds used for the modified amine (C-1) may include monoglycidyl ether compounds such as phenylglycidyl ether, allyl glycidyl ether, methyl glycidyl ether, butyl glycidyl ether, secondary butyl glycidyl ether, 2-ethylhexyl glycidyl ether, 2-methyloctyl glycidyl ether, and stearyl glycidyl ether; monoglycidyl ester compounds such as glycidyl esters of versatic acid; polyglycidyl ether compounds of mononuclear polyvalent phenolic compounds such as hydroquinone, resorcin, pyrocatechol, and phloroglucinol; polyglycidyl ether compounds of polynuclear polyvalent phenol compounds such as dihydroxynaphthalene, biphenol, methylene bisphenol (i.e., bisphenol F), methylene bis(orthocresol), ethylidene bisphenol, isopropylidene bisphenol (i.e., bisphenol A), isopropylidene bis(orthocresol), tetrabromobisphenol-A, 1,3-bis(4-hydroxycumylbenzene), 1,4-bis(4-hydroxycumylbenzene), 1,1,3-tris(4-hydroxyphenyl) butane, 1,1,2,2-tetra(4-hydroxyphenyl) ethane, thiobisphenol, sulfobisphenol, oxybisphenol, phenol novolak, orthocresol novolak, ethylphenol novolak, butylphenol novolak, octylphenol novolak, resorcin novolak, and terpene phenol; polyglycidyl ethers of polyvalent alcohols such as ethylene glycol, propylene glycol, butylene glycol, hexanediol, polygiycol, thiodiglycol, glycerin, trimethylolpropane, pentaerythritol, sorbitol, and bisphenol A ethylene oxide adduct; glycidyl esters of aliphatic, aromatic or alicyclic polybasic acid such as maleic acid, fumaric acid, itaconic acid, succinic acid, glutaric acid, suberic acid, adipic acid, azelaic acid, sebacic acid, dimeric acid, trimeric acid, phthalic acid, isophthalic acid, terephthalic acid, trimellitic acid, trimesic acid, pyromellitic acid, tetrahydrophthalic acid, hexahydrophthalic acid, and endomethylene tetrahydrophthalic acid; homopolymers or copolymers of glycidyl methacrylate; epoxy compounds having a glycidylamino group such as N, N-diglycidylaniline, bis (4-(N-methyl-N-glycidylamino) phenyl) methane, and diglycidyl orthotoluidine; epoxy compounds of cyclic olefin compounds such as vinyl cyclohexene diepoxide, dicyclopentadiene diepoxide, 3,4-epoxycyclohexylmethyl-3,4-epoxycyclohexanecarboxylate, 3,4-epoxy-6-methylcyclohexylmethyl-6-methylcyclohexanecarboxylate, and bis(3,4-epoxy-6-methylcyclohexylmethyl) adipate; epoxidized conjugated diene polymers such as epoxidized polybutadiene and epoxidized styrene-butadiene copolymer; and heterocyclic compounds such as triglycidyl isocyanurate.

One of these epoxy compounds may be used alone or two or more of these epoxy compounds may be used in combination.

The epoxy compounds used for the modified amine (C-1) is preferably a polyglycidyl ether compound having two or more epoxy groups per molecule, and is particularly preferably a polyglycidyl ether of bisphenol compounds such as methylene bisphenol (i.e., bisphenol F), methylene bis(orthocresol), ethylidene bisphenol, isopropylidene bisphenol (i.e., bisphenol A), or isopropylidene bis(orthocresol).

When preparing the modified amine (C-1), an amine compound and an epoxy compound may be reacted with each other so that primary and/or secondary amino groups remain after the reaction. For example, in the case where an amine compound having two or more primary and/or secondary amine groups per molecule is reacted with an epoxy compound, it is preferred that the epoxy compound is reacted in an amount corresponding to an epoxy equivalent of 0.5 to 2, and more preferably 0.8 to 1.5 relative to 1 mol of the amine compound.

The latent amine curing agent (C) may be a mixture (C-2) of the modified amine (C-1) and a phenolic resin. The mixture (C-2) may contain one modified amine (C-1) or may contain two or more modified amines (C-1), Similarly, the mixture (C-2) may contain one phenolic resin, or may contain two or more phenolic resins. When the mixture (C-2) is used as the latent amine curing agent (C), storage stability of the photocurable adhesive 1 can be further improved.

The phenolic resins used in combination with the modified amine (C-1) may be, for example, resins obtainable by polycondensation of phenols and aldehydes. Examples of the phenols may include phenol, cresol, ethylphenol, n-propylphenol, isopropylphenol, butylphenol, tertiary butylphenol, octylphenol, nonylphenol, dodecylphenol, cyclohexylphenol, chlorophenol, bromophenol, resorcin, catechol, hydroquinone, 2,2-bis(4-hydroxyphenyl) propane, 4,4'-thiodiphenol, dihydroxydiphenylmethane, naphthol, terpenephenol, and phenolate dicyclopentadiene. Also, the aldehydes may be, for example, formaldehyde.

In the mixture (C-2) of the modified amine (C-1) and a phenolic resin, the content of the phenolic resin may be appropriately determined in the range of, for example, 10 parts by mass or more and 100 parts by mass or less, relative to 100 parts by mass of the modified amine (C-1).

1-4. Ion Scavenger (D)

The Ion scavenger (D) has a function of capturing ionic volatile components, volatile organic acids, and the like produced in the cured product of the photocurable adhesive 1. The ionic volatile components or volatile organic acids produced in the cured product may be derived, for example, from components of the photocurable agent 1, glass contained in the material that is a target of adhesion, and the like. The ion scavenger (D) may be an organic material or an inorganic material, as long as the material has the function mentioned above. From the perspective of heat resistance, the ion scavenger (D) is preferably an inorganic material. Furthermore, the photocurable adhesive 1 may contain one of the ion scavenger (D) or may contain two or more of the ion scavenger (D).

The content of the ion scavenger (D) can be appropriately determined so as to be in the range of 0.01 parts by mass or more and 5 parts by mass or less relative to 100 parts by mass of the epoxy resin (B) and the latent amine curing agent (C) in total, The ion scavenger (D) preferably has an ion exchange capacity of 1.0 meq/g or more, By using the ion scavenger (D), more ionic volatile components can be captured, and thus the amount of gas externally discharged from the cured product of the photocurable adhesive 1 can be further reduced. Furthermore, the photocurable adhesive 1 containing the ion scavenger (D) has good anti-fog properties in the high temperature and high humidity environments and thus, when it is used for optical devices, can prevent deterioration in optical characteristics of the optical elements for a longer period of time.

The ion exchange capacity of the ion scavenger (D) can be measured, for example, using the method described in WO2008/053694. Specifically, first, a measurement sample is placed in a 100 ml polyethylene container together with 50 of a sodium hydroxide aqueous solution with a concentration of 0.1 mol/L. The container is shaken for 20 hours at 40° C., followed by collecting the supernatant from inside the container. Separately, following the same procedure as above, except for placing no measurement sample in the container, a blank is collected from the contents of the container. Then, sodium ion concentration of the supernatant and that of the blank are measured using an inductively coupled plasma emission spectrometry method (i.e., ICP). The sodium ion concentration of the supernatant is subtracted from the sodium ion concentration of the blank obtained in this way to calculate an equivalent of the sodium ion held by the sample. Then, the equivalent of the sodium ion is divided by the weight of the sample and the obtained value is taken to be the ion exchange capacity of the ion scavenger (D). It should be noted that, usually, the ion exchange capacity of the ion scavenger (D) is 10 meq/g or less.

The ion scavenger (D) is preferably inorganic particles. Inorganic particles have good heat resistance and are easy to disperse evenly in the photocurable adhesive 1.

The ion scavenger (D) preferably contains one or more of metal elements selected from the group consisting of Zr (zirconium), Sb (antimony), Bi (bismuth), Y (yttrium), Al (aluminum), Mg (magnesium), La (lanthanum), and Nd (neodymium). In this case, the performance of capturing the ionic volatile components can be further improved in the high temperature and high humidity environments.

The ion scavenger (D) containing a metal element may be formed of an elemental metal or may be formed of a metallic compound. Examples of the ion scavenger (D) may include zirconium phosphate, zirconium tungstate, zirconium molybdate, zirconium antimonate, zirconium selenate, zirconium tellurate, zirconium silicate, zirconium phosphate, zirconium polyphosphate, bismuth oxide compound, bismuth hydroxide compound, yttrium oxide, lanthanum oxide, neodymium oxide, magnesium aluminum composite oxide, hydrotalcite, hydrocalumite, hydroomite, zeolite, and other metal composite oxides. These materials may be natural products or synthetic products.

Furthermore, the ion scavenger (D) may be, for example, commercial products such as IXE-100, IXE-300, IXE-500, IXE-530, IXE-550, IXE-600, IXE-633, IXE-700F, IXE-770D, IXE-800, IXE-1000, IXE-6107, IXE-6136, IXEPLAS-A1, IXEPLAS-A2, and IXEPLAS-B1 manufactured by Toagosei Co., Ltd. or KYOWAAD 200, KYOWAAD 500, KYOWAAD 600, KYOWAAD 700, KW-2000, and DHT-4A manufactured by Kyowa Chemical Industry Co., Ltd.

It should be noted that IXE and IXEPLAS are registered trademarks of Toagosei Co. Ltd., and KYOWAAD and DHT-4A are registered trademarks of Kyowa Chemical Industry Co., Ltd.

From the perspective of further improving the performance of capturing the ionic volatile components in the high temperature and high humidity environments, the ion scavenger (D) is more preferably a metal compound.

The ion scavenger (D) preferably has a volume-based particle size distribution in which the median size is 0.001 μm or more and 100 μm or less, and more preferably 0.01 μm or more and 20 μm or less. In this case, the performance of capturing the ionic volatile components can be further improved in the high temperature and high humidity environments. It should be noted that the particle size distribution mentioned above can be obtained, for example, using a laser diffraction scattering method.

The ion scavenger (D) is more preferably contain Zr, Al, and Mg. When the photocurable adhesive 1 containing the ion scavenger (D) is applied to optical devices, good anti-fog properties can be exerted. In this regard, the ion scavenger (D) is more preferably formed of inorganic particles containing Zr, Al, and Mg, particularly preferably formed of inorganic particles containing Zr, Al, and Mg and having a volume-based particle size distribution in which the median size is 0.01 μm or more and 10 μm or less, and most preferably inorganic particles containing Zr, Al, and Mg, without containing Bi, and having a volume-based particle size distribution in which the median size is 0.01 μm or more and 10 μm or less. As such an ion scavenger (D), IXEPLAS-A1 or IXEPLAS-A2 manufactured by Toagosei Co., Ltd. may be mentioned.

1-5. Filler

The epoxy adhesive component 11 may contain a filler 13, in addition to the critical materials of the cyanate ester resin (A), the epoxy resin (B), the latent amine curing agent (C) and the ion scavenger (D), When the filler 13 is mixed in the epoxy adhesive component 11, physical properties of the cured product of the photocurable adhesive 1 can be further improved. The filler 13 may be, for example, an inorganic filler such as silica, alumina, aluminum nitride, glass, boron nitride, titanium dioxide, kaolin, clay, talc, carbon fibers, iron oxide, diamond or the like. The filler 13 preferably has transparency, and more preferably has transmittance of 80% or more for infrared laser light is having a wavelength in the range of 800 nm to 1,100 nm. In this case, curability of the photocurable adhesive 1 can be improved.

2. Light-Absorbing Component

The photocurable adhesive 1 contains the light-absorbing component 12 which is configured to generate heat by absorption of laser light. The light-absorbing component 12 has a function of generating heat by application of laser light thereto to heat and cure the epoxy adhesive component 11. As the light-absorbing component 12, for example, light-absorbing materials such as carbon black, black gold-containing coating materials, azine-based coating materials, and nigrosine-based compounds can be used. The nigrosine-based compounds may be, for example, water-insoluble nigrosine-based compounds such as sulfates and phosphates of nigrosine. One of these light-absorbing materials may be used alone or two or more of these light-absorbing materials may be used in combination. The light-absorbing component 12 is preferably formed of carbon black. In this case, curability of the photocurable adhesive 1 for laser light can be further improved.

The content of the light-absorbing component 12 may be, for example, 0.1 mass % or less relative to the entire photocurable adhesive 1.

3. Other Components

The photocurable adhesive 1 may contain various, additives used for adhesives, other than the epoxy adhesive component 11 and the light-absorbing component 12.

For example, the photocurable adhesive 1 may contain various solvents to facilitate handling. The solvents are preferably organic solvents. More specifically, these solvents may be ethers such as tetrahydrofuran, 1,2-dimethoxyethane, and 1,2-diethoxyethane; alcohols such as iso- or n-butanol, iso- or n-propanol, amyl alcohol, benzyl alcohol, furfuryl alcohol, and tetrahydrofurfuryl alcohol; ketones such as methyl ethyl ketone, methyl isopropyl ketone, and methyl butyl ketone; aromatic hydrocarbons such as benzene, toluene, and xylene; triethylamine; pyridine; dioxane; acetonitrile; and the like.

Second Embodiment

In the present embodiment, a description will be given of an example in which the photocurable adhesive 1 of the first embodiment is applied to various types of optical device 2, Of the reference signs used in the present embodiment and the subsequent embodiments, reference signs which are the same as those used in the foregoing embodiments indicate similar components and the like of the foregoing embodiments unless otherwise mentioned.

Figure 2:
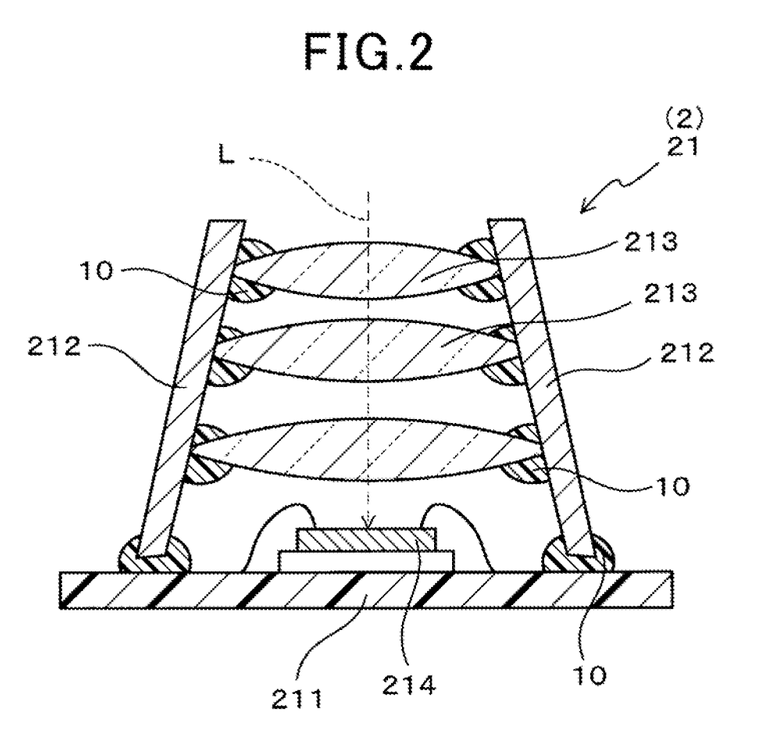
FIG. 2 is a cross-sectional view illustrating a principal part of a lens module to which a photocurable adhesive is applied, according to a second embodiment.

The photocurable adhesive 1 of the first embodiment can be applied to various types of optical device 2. The optical device 2 may be, for example, a lens module 21 as shown in FIG. 2, The lens module 21 shown in FIG. 2 includes a circuit board 211, a lens holder 212 provided on the circuit board 211, one or more lenses 213 held by the lens holder 212, and an imaging device 214 held on the circuit board 211 so as to be located on an optical path L of the lenses 213, These components are bonded together via a cured product 10 of the photocurable adhesive 1. It should be noted that the lens holder 212 may hold optical filters instead of the lenses 213.

Figure 3:
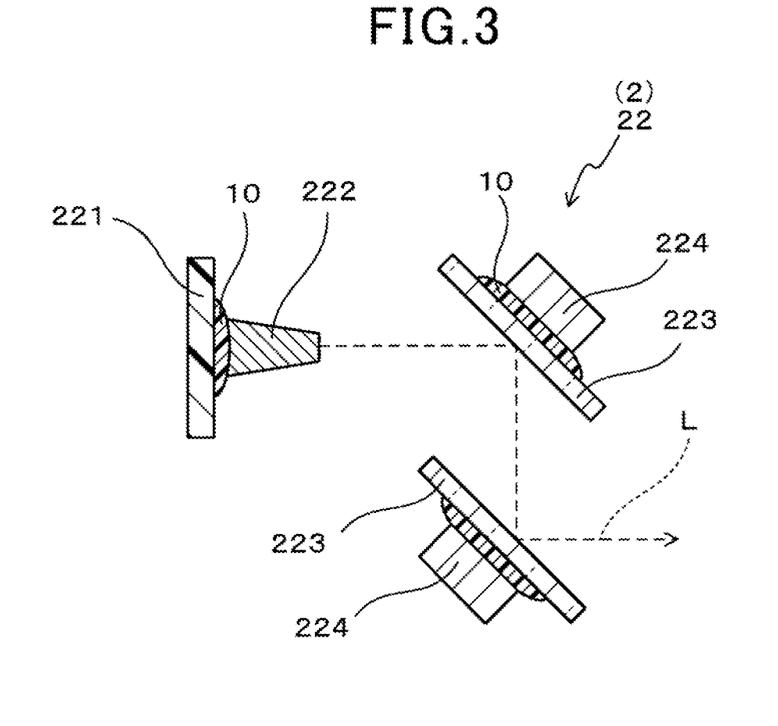
FIG. 3 is a schematic diagram illustrating a principal part of a LIAR module to which a photocurable adhesive is applied according to the second embodiment.

The optical device 2 may be, for example, a LiDAR module as shown in FIG. 3, The LiDAR module 22 shown in FIG. 3 includes a circuit board 221, a light source 222 supported by the circuit board 221, one or more reflectors 223 located on an optical path L of light emitted from the light source 222, and fixing bases 224 respectively supporting the reflectors 223. A cured product 10 of the photocurable adhesive 1 is provided between the circuit board 221 and the light source 222, and between each reflector 223 and the corresponding one of the fixing bases 224 to bond these components together. It should be noted that a laser diode or the like, for example, may be used for the light source 222.

Figure 4:
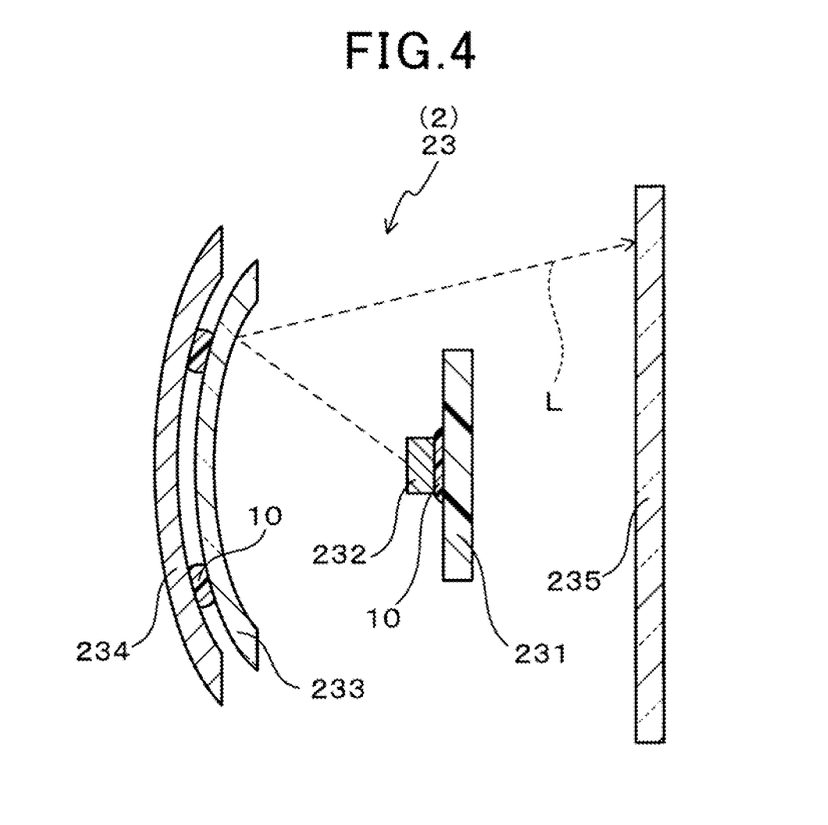
FIG. 4 is a schematic diagram illustrating a principal part of a head-up display to which a photocurable adhesive is applied, according to the second embodiment.

The optical device 2 may be, for example, a head-up display 23 as shown in FIG. 4. The head-up display 23 shown in FIG. 4 includes a circuit board 231, a light source 232 supported by the circuit board 231, a magnifying mirror 233 located on an optical path L of light emitted from the light source 232, a stay 234 supporting the magnifying mirror 233, and a screen 235 located on an optical L of light reflected by the magnifying mirror 233. The cured product 10 of the photocurable adhesive 1 is provided between the circuit board 231 and the light source 232, and between the magnifying mirror 233 and the stay 234 to bond these components together.

When the photocurable adhesive 1 of the first embodiment is applied to various types of optical devices 2 described above, the amount of gas externally discharged from the cured product 10 of the photocurable adhesive 1 can be reduced. Consequently, the gas discharged from the cured product 10 can be prevented from sublimating to optical elements, such as the lenses 213, the imaging device 214, the optical filters, the reflectors 223, and the magnifying mirror 233. Consequently, transmittance or reflectance of the optical elements can be prevented from being deteriorated, for a long period of time.

EXAMPLE

In the present example, more specific formulation of the photocurable adhesive 1 related to the first embodiment will be described. In the present example, there were prepared photocurable adhesives 1 (test agent S1 and test agent S2) each containing the cyanate ester resin (A), epoxy resin (B), latent amine curing agent (C), ion scavenger (D), light-absorbing component 12, and filler 13 at a mass ratio shown in Table 1. The cyanate ester resin (A), epoxy resin (B), latent amine curing agent (C), ion scavenger (D), light-absorbing component 12, and filler 13 used in the present example were specifically as follows.

Cyanate Ester Resin (A)
  CY-1: Bisphenol type cyanate ester resin (LECy manufactured by Lonza)

Epoxy Resin (B)
  EP-1: Bisphenol type epoxy resin (ADEKA RESIN EP-4300E manufactured by Adeka Corporation)
  EP-2: Glycidylamine type epoxy resin (ADEKA RESIN EP 950S manufactured by Adeka Corporation)
  EP-3: Dicyclopentadiene type epoxy resin (ADEKA RESIN EP-40885 manufactured by Adeka Corporation)

It should be noted that ADEKA RESIN is a registered trademark of Adeka Corporation.

Latent Amine Curing Agent (C)
  EH-1: Mixture (C-2) of a modified amine (C-1) prepared through the following process and a phenolic resin First, 201 g (i.e., 2.71 mol) of 1,2-diaminopropane was placed in a flask and was heated to 60° C. Next, while the temperature in the system was maintained in the range of 100° C. to 110° C., 580 g of bisphenol A type epoxy resin (ADEKA RESIN EP-4100E manufactured by Adeka Corporation, epoxy equivalent: 190) was gradually added to the flask. It should be noted that when the 1,2-diaminopropane and the bisphenol A type epoxy resin are mixed with each other as mentioned above, the epoxy equivalent of the bisphenol A type epoxy resin relative to 1 mol of the 1,2-diaminopropane is 1,12.

After completing addition of the bisphenol A type epoxy resin, the temperature inside the reaction system was raised to 140° C., and this temperature was maintained for 1.5 hours to cause reaction in the contents. Through the process described above, a modified amine (C-1) was obtained.

Next, 100 g of the modified amine (C-1) obtained through the above process was mixed with 30 g of phenolic resin (MP-800K manufactured by Asahi Yukizai Corporation, softening temperature: 100° C.), and the mixture was left to stand at a temperature of 180° C. to 190° C. for 1 hour in the reduced pressure environment of 30 Torr to 40 Torr, for decompression and degassing. Thus, unreacted materials were removed from the mixture. After that, the mixture was ground in a jet mill. Through the process described above, EH-1 was obtained.

Ion Scavenger (D)
  IC-1: Organic particulate material containing Mg, Al and Zr (IXEPLAS-A1 manufactured by Toagosei Co., Ltd., median size: 0.5 µm, sodium ion exchange capacity: 1 meq/g or more and 10 meq/g or less)

Light-Absorbing Component 12
  P-1: Titanium black (13M-C manufactured by Mitsubishi Materials Electronic Chemicals Co., Ltd., primary particle size: 97 nm)
  P-2; Carbon black (#750B manufactured by Mitsubishi Carbon Black Corporation, primary particle size: 22 nm)

Filler 13
Silica (200 X-E1 Manufactured by Admatechs)

In the present example, test agents S3 and S4 were prepared for comparison with the text agents S1 and S2. The test agents S3 and S4 were formulated similarly to the test agents S1 and S2 except that the amounts of the components were changed as shown in Table 1.

Next, the test agents S1 to S4 were evaluated in terms of laser curability and anti-fog properties through the following process.

Laser Curability 0.1 g of each test agent was thinly spread on the bottom surface of a petri dish made of ordinary glass, having an outer diameter of 75 mm and a is height of 20 mm. Next, the test agent was irradiated with near infrared laser light having a wavelength of 915 nm with an output power of 3 W for 5 seconds. After that, a spatula was brought into contact with the test agent in the petri dish to determine whether it was cured. When the test agent did not adhere to the spatula and was sufficiently cured, a symbol A was marked in the column of laser curability of Table 1, When the test agent adhered to the spatula or deformed due to contact with the spatula, curability of the test agent was determined to be insufficient and a symbol B was marked in the column.

Anti-Fog Properties

Each test agent was applied to the inside of a glass petri dish through a similar process performed for the evaluation of laser curability, and then laser light was applied to the test agent. Furthermore, the glass petri dish was heated for 1 hour in an oven set to 120° C. to sufficiently cure the test agent in the petri dish.

Next, the petri dish, in which a cured product of the test agent was present, was covered with a cap so that a gap of about 500 µm was made therebetween. The glass petri dish was left to stand in a constant temperature and humidity bath at a temperature of 85° C. and relative humidity of 85% RH. At the points when the total standing time in the constant temperature and humidity bath had reached 500 hours, 1,000 hours and 2,000 hours, the glass petri dish was taken out of the bath, and the glass surface around the cured product was observed using an optical microscope. Thus, anti-fog properties were evaluated based on the time for fogging to occur on the glass surface.

The symbols indicated in the column of anti-fog properties of Table 1 represent the following evaluations.
  A: Substantially no fogging occurred on the glass surface at the point of 2,000 hours.

B: Substantially no fogging occurred on the glass surface at the point of 1,000 hours, but fogging occurred thereon at the point of 2,000 hours.

C: Substantially no fogging occurred on the glass surface at the point of 500 hours, but fogging occurred thereon at the point of 1,000 hours.

D: Fogging occurred on the glass surface at the point of 500 hours.

TABLE 1

|  |  |  | T.A. S1 | T.A. S2 | T.A. S3 | T.A. S4 |
|---|---|---|---|---|---|---|
| Cyanate ester resin (A) | CY-1 | Mass parts | 15.0 | 15.0 | 15.0 | 33.3 |
| Epoxy resin (B) | EP-1 | Mass parts | 2.0 | 2.0 | 2.0 | 33.3 |
|  | EP-2 | Mass parts | 2.0 | 2.0 | 2.0 | — |
|  | EP-3 | Mass parts | 1.0 | 1.0 | 1.0 | — |
| Latent curing agent (C) | EH-1 | Mass parts | 7.0 | 7.0 | 7.0 | 33.3 |
| Filler | Silica | Mass parts | 70.0 | 70.0 | 70.0 | 55.0 |
| Ion scavenger (D) | IC-1 | Mass parts | 1.0 | 0.5 | — | — |
| Light-absorbing component | P-1 | Mass parts | 0.003 | 0.003 | 0.003 | — |
|  | P-2 | Mass parts | — | — | — | 0.005 |
| Ratio of (D) relative to 100 parts by mass of (A) to (C) in total |  | Mass parts | 3.7 | 1.9 | 0 | 0 |
| Curability |  | — | A | A | A | A |
| Anti-fog properties |  | — | A | B | D | D |

(T.A. = Test Agent)

As shown in Table 1, the epoxy adhesive component 11 of the test agents S1 and S2 contained the ion scavenger (D). Therefore, these test agents could be cured by laser light irradiation. Also, these test agents could prevent adhesion of the deposits to the glass petri dishes even when they were left to stand in the environment of 85° C. and 85% RH.

On the other hand, the test agents S3 and S4 did not contain the ion scavenger (D). Therefore, when these test agents were left to stand in the environment of 85° C. and 85% RH, they were inferior in anti-fog properties to the test agents S1 and S2, causing the deposits to adhere to the petri dishes earlier.

The present disclosure should not be construed as being limited to the embodiments and the mode of the example described above, but may be applied to various embodiments without departing from the spirit of tine present disclosure.

What is claimed is:

1. A photocurable adhesive formulated to be curable by laser light irradiation, comprising
   an epoxy adhesive component; and
   a light-absorbing component configured to generate heat by the laser light irradiation, wherein
   the epoxy adhesive component contains a cyanate ester resin, an epoxy resin, a latent amine curing agent containing active hydrogen, and an ion scavenger, and
   the ion scavenger has an ion exchange capacity of 1.0 meq/g or more.

2. The photocurable adhesive according to claim 1, wherein the ion scavenger is inorganic particles.

3. The photocurable adhesive according to claim 1, wherein the ion scavenger contains one or more of metal elements selected from a group consisting of Zr, Sb, Bi, Y, Al, Mg, La, and Nd.

4. The photocurable adhesive according to claim 3, wherein the ion scavenger contains Zr, Al, and Mg.

5. The photocurable adhesive according to claim 1, wherein the latent amine curing agent is at least one selected from a group consisting of a modified amine obtainable by reaction of an amine compound having one or more active hydrogen atoms per molecule with an epoxy compound, and a mixture of the modified amine and a phenolic resin.

6. The photocurable adhesive according to claim 5, wherein the latent amine curing agent is the mixture of the modified amine and the phenolic resin.

7. The photocurable adhesive according to claim 1, wherein the cyanate ester resin is at least one selected from a group consisting of compounds expressed by the following General Formula (1), compounds expressed by the following General Formula (2), and polymers which are polymers of at least one of the compounds expressed by General Formula (1) and/or General Formula (2)

$$N{\equiv}C{-}O{-}A^1{-}Y^1{-}A^2{-}O{-}C{\equiv}N \qquad \text{General Formula (1)}$$

(In General Formula (1), $A^1$ and $A^2$ each independently represent an unsubstituted phenylene group, or a phenylene group substituted with one or more of alkyl groups having 1 to 4 carbon atoms, and $Y^1$ represents a divalent hydrocarbon group that may have an ether bond, thioether bond, or substituent group)

General Formula (2)

(In General Formula (2), m represents an integer equal to or greater than 1, $R^1$ to $R^6$ each independently represent a hydrogen atom or an alkyl group having 1 to 4 carbon atoms, and $Y^2$ and $Y^3$ each independently represent a divalent hydrocarbon group or a fluorine-substituted divalent alkylene group).

8. The photocurable adhesive according to claim 7, wherein $Y^1$ in General Formula (1) and $Y^2$ and $Y^3$ in General Formula (2) are each at least one of divalent hydrocarbon groups expressed by the following Structural Formulae (3) to (11)

Structural Formula (3)

(In Structural Formula (3), the mark * represents atomic bonding, and $R^7$ and $R^8$ each independently represent a hydrogen atom, an unsubstituted methyl group, or a fluorine-substituted methyl group)

Structural Formula (4)

(In Structural Formula (4), the mark * represents atomic bonding)

Structural Formula (5)

(In Structural Formula (5), the mark * represents atomic bonding)

Structural Formula (6)

(In Structural Formula (6), the mark * represents atomic bonding)

Structural Formula (7)

(In Structural Formula (7), the mark * represents atomic bonding)

Structural Formula (8)

(In Structural Formula (8), the mark * represents atomic bonding)

Structural Formula (9)

(In Structural Formula (9), the mark * represents atomic bonding)

Structural Formula (10)

(In Structural Formula (10), the mark * represents atomic bonding)

Structural Formula (11)

(In Structural Formula (11), n represents an integer that is 4 or greater and 12 or smaller, and the mark * represents atomic bonding).

* * * * *